Aug. 16, 1932.

J. J. McCABE

LENS BLOCKING DEVICE

Re. 18,569

Original Filed June 2, 1927

4 Sheets-Sheet 1

INVENTOR
Joseph J. McCabe
BY
Crumpton & Griffith
his ATTORNEYS

J. J. McCABE

Aug. 16, 1932. LENS BLOCKING DEVICE Re. 18,569

Original Filed June 2, 1927 4 Sheets-Sheet 2

INVENTOR
Joseph J. McCabe
BY
Crumpton & Griffith
his ATTORNEYS

J. J. McCABE

Aug. 16, 1932. LENS BLOCKING DEVICE Re. 18,569

Original Filed June 2, 1927 4 Sheets-Sheet 3

INVENTOR
Joseph J. McCabe
BY
Crumpton & Griffith
his ATTORNEYS

J. J. McCABE
Aug. 16, 1932. LENS BLOCKING DEVICE Re. 18,569
4 Sheets-Sheet 4
Original Filed June 2, 1927
Fig.8
Fig.4
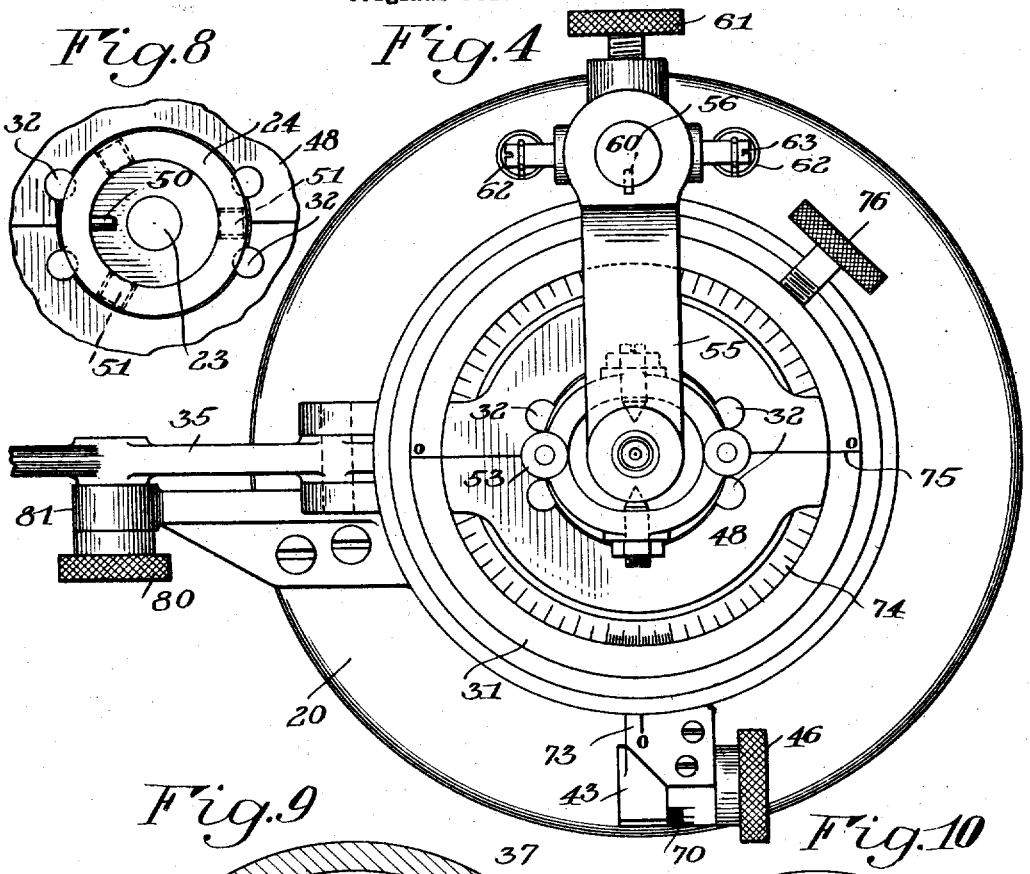
Fig.9
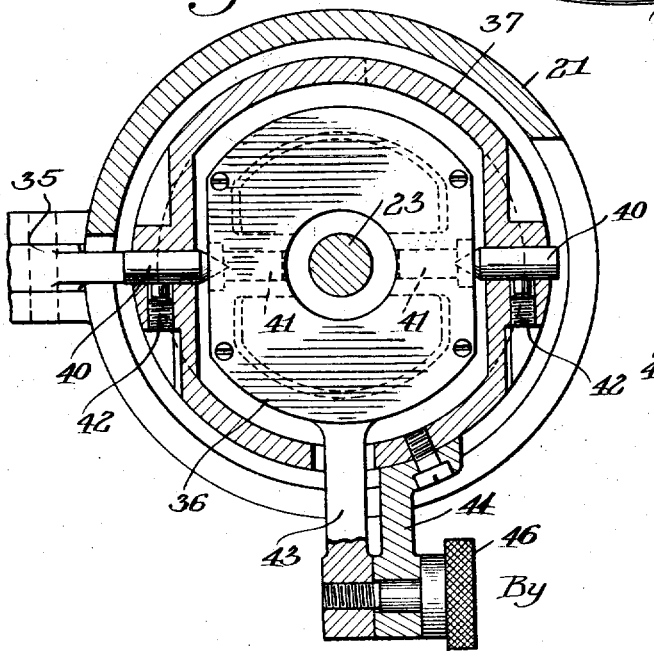
Fig.10
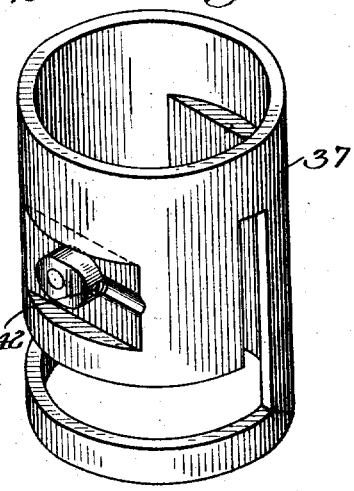
Inventor
Joseph J. McCabe
By Crumpton & Griffith
his ATTORNEYS Reissued Aug. 16, 1932 Re. 18,569

UNITED STATES PATENT OFFICE

JOSEPH J. McCABE, OF ROCHESTER, NEW YORK, ASSIGNOR TO BAUSCH & LOMB OPTICAL COMPANY, OF ROCHESTER, NEW YORK, A CORPORATION OF NEW YORK

LENS BLOCKING DEVICE

Original No. 1,727,889, dated September 10, 1929, Serial No. 196,112, filed June 2, 1927. Application for reissue filed June 26, 1931. Serial No. 547,163.

This invention relates to a lens blocking device and particularly to a device by means of which a lens blank may be attached to a lens block in such a manner that it may be accurately ground to provide a lens of the proper curvature and thickness. The device of this application is particularly adapted for use in connection with the toric lens generating machine which forms the subject matter of my copending application, Serial No. 181,202, filed April 5, 1927.

An object of this invention is to provide a device of the above nature which is of simple and durable construction and by means of which lens blanks may be quickly and accurately positioned on blocking bodies. Another object is to provide a device by means of which a lens blank which is to be ground to provide a lens with prism may be so positioned on a blocking body that the base of the prism may be accurately located in any desired meridian. Another object is to provide a device by means of which a lens blank may be so positioned on a blocking body that the cylinder axis of the finished lens may be located in any desired meridian. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings in which is shown one of the various possible embodiments of this invention, Figure 1 is a front elevation of the assembled device;

Figure 4 is a plan view of the assembled device;

Figure 7 is a view showing the effect of the grinding operation on the lens shown in Figure 3;

Figure 8 is a fragmentary plan view of the device with the lens retaining means and lens block removed, and showing the lens block adapter;

Figure 9 is a sectional plan view taken immediately above the table member; and

Figure 10 is a perspective view of the rotatable support for the table member.

Similar reference characters refer to similar parts throughout the several views of the drawings.

Figure 1:
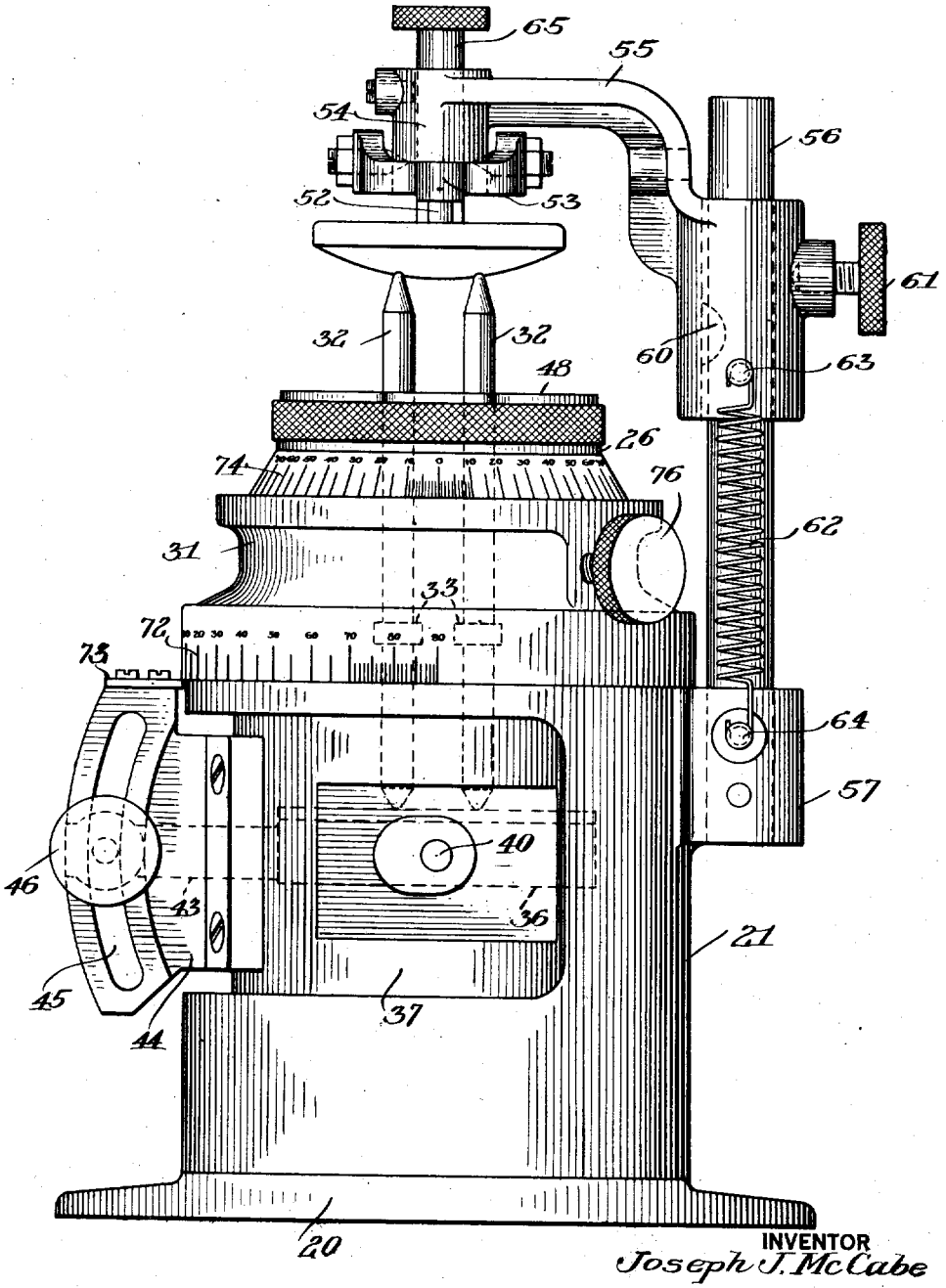

Referring now to the drawings in detail, there is shown a base 20 having a substantially cylindrical supporting member 21 detachably mounted thereon. A vertically bored lug 22 may be integrally formed with or rigidly mounted upon the upper surface of the base 20 substantially centrally thereof. A rod or plunger 23 having an adapter 24 rigidly mounted on an end portion thereof is mounted for vertical sliding movement within the opening in the member 22. A key 25 locks the rod 23 against rotation.

The rod 23 also extends through centrally disposed openings in the guide members 26 and 27 which are detachably connected by means of the screws 30. The guide members 26 and 27 are rotatable as a unit relatively to the rod 23, adapter 24, and supporting member 21 and have surfaces engaging the inner, upper and lower surfaces of an annular shoulder 31 formed on the upper portion of the supporting member 21.

Four lens supporting pins 32 of equal lengths and provided with tapered end portions extend through openings in the members 26 and 27 to points above and below said members. Each pin 32 is provided with a collar 33 which is adapted for contact with the upper surface of the member 27 to limit the downward movement of said pin. A helical spring 34 is mounted on each pin between the collar 33 and the lower surface of the member 26.

The rod 23 carrying the lens block adapter 24 may be moved upwardly, for a purpose to be later described, through the agency of a pivoted lever 35 which is supported by a lug formed on the supporting member 21. The inner end portion of the lever 35 is provided with a rounded upper surface with which the lower rounded end of the rod 23 is normally in contact.

The lower end portions of the lens supporting pins 32 are normally in contact with the upper surface of a pivoted table member 36 carried by the substantially cylindrical supporting member 37. Pin members 40, provided with tapered end portions, extend through openings in opposite sides of the member 37 and have their tapered ends extending into recesses formed in pins 41 mounted on opposite sides of the table member. Set screws 42 permit adjustment of the pins 40. An adjusting arm 43 may be rigidly mounted on or formed integrally with the table member. The adjusting arm 43 extends from the interior to the exterior of the device through slots formed in the walls of the members 21 and 37.

The slot formed in the member 37 is substantially L-shaped to permit vertical movement of the adjusting arm 43 and rotational movement of the member 37 relatively to the pivoted lever 35. The slot in the member 21 is so formed that the lever 35 and bracket 44 may extend therethrough and it is of sufficient length that the bracket 44 may move through substantially 180 degrees.

The bracket 44 is mounted on the outer wall of the member 37 adjacent the adjusting arm 43 and provided with an arcuate substantially vertically extending slot 45 through which a locking screw 46 is adapted to extend. The threaded end portion of the locking screw 46 is adapted to fit within a threaded opening in the outer end portion of the adjusting arm 43. The locking screw 46 may be manipulated to lock the arm 43 in contact with the bracket 44. An index plate 48 is provided with a central opening and arcuate grooves for the reception of the lens supporting pins. The index plate rests upon the upper surface of the member 26 and may be moved vertically.

Figure 3:
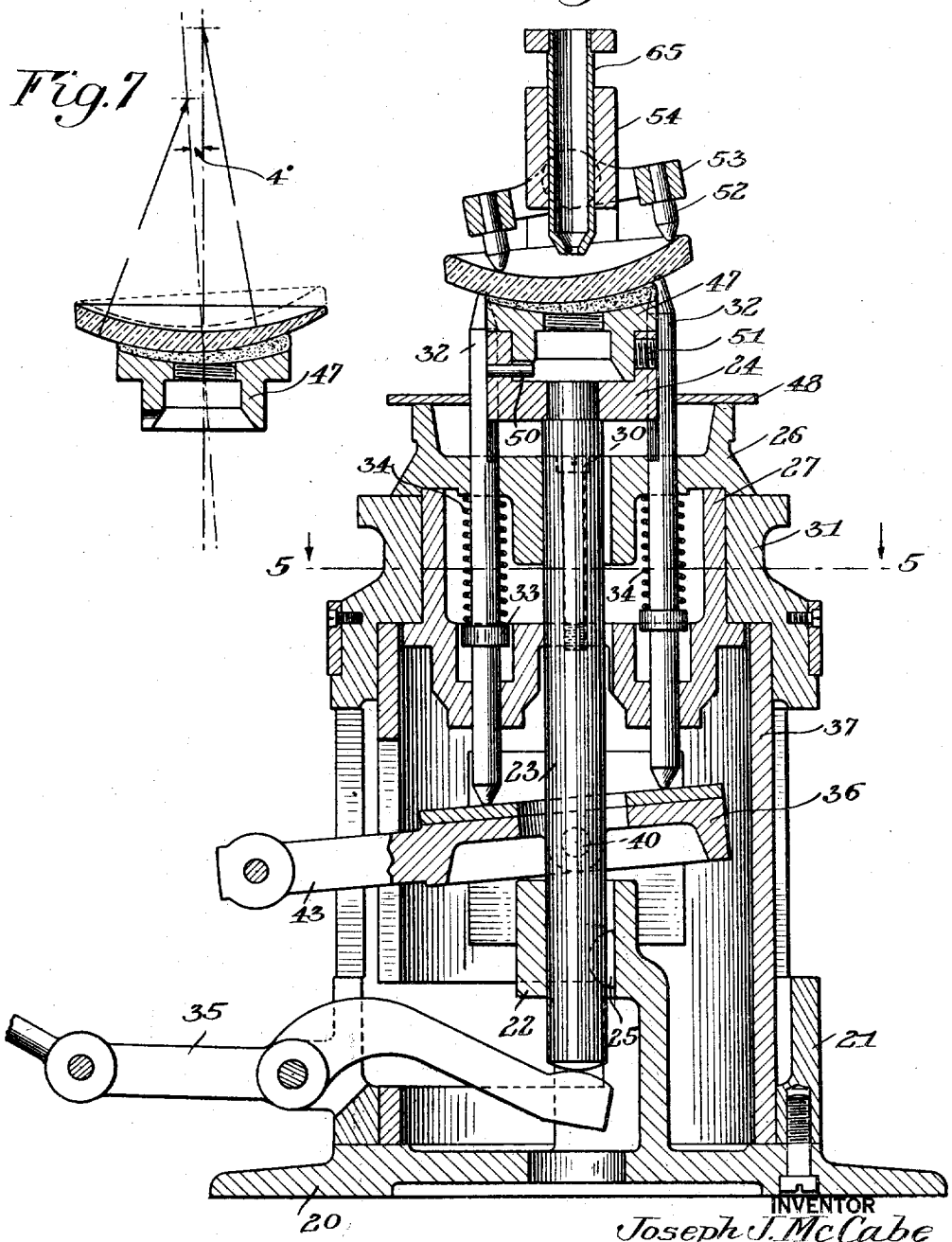
Figure 3 is a sectional side elevation taken substantially through the center of Figure 2 and showing the table member rotated through ninety degrees.

In attaching a lens blank to a lens blocking body, a blocking body 47 such as that shown in Figures 3 and 7 is provided on its upper surface with a ring layer of pitch or other adhesive substance and mounted on the adapter 24. The adapter is provided with a rigidly mounted pin 50 which corresponds to a pin carried by the lens block supporting bracket of the lens grinding machine, and the lens block is provided with a slot or recess for receiving the said pins. Set screws 51 are provided for locking the blocking body in position in the adapter. The adapter and its supporting rod may be removed from the device for the purpose of positioning and removing the lens blocking body, grooves being provided in the members 26 and 27 to permit the key 25 to be drawn therethrough.

Figures 2, 5, 6:
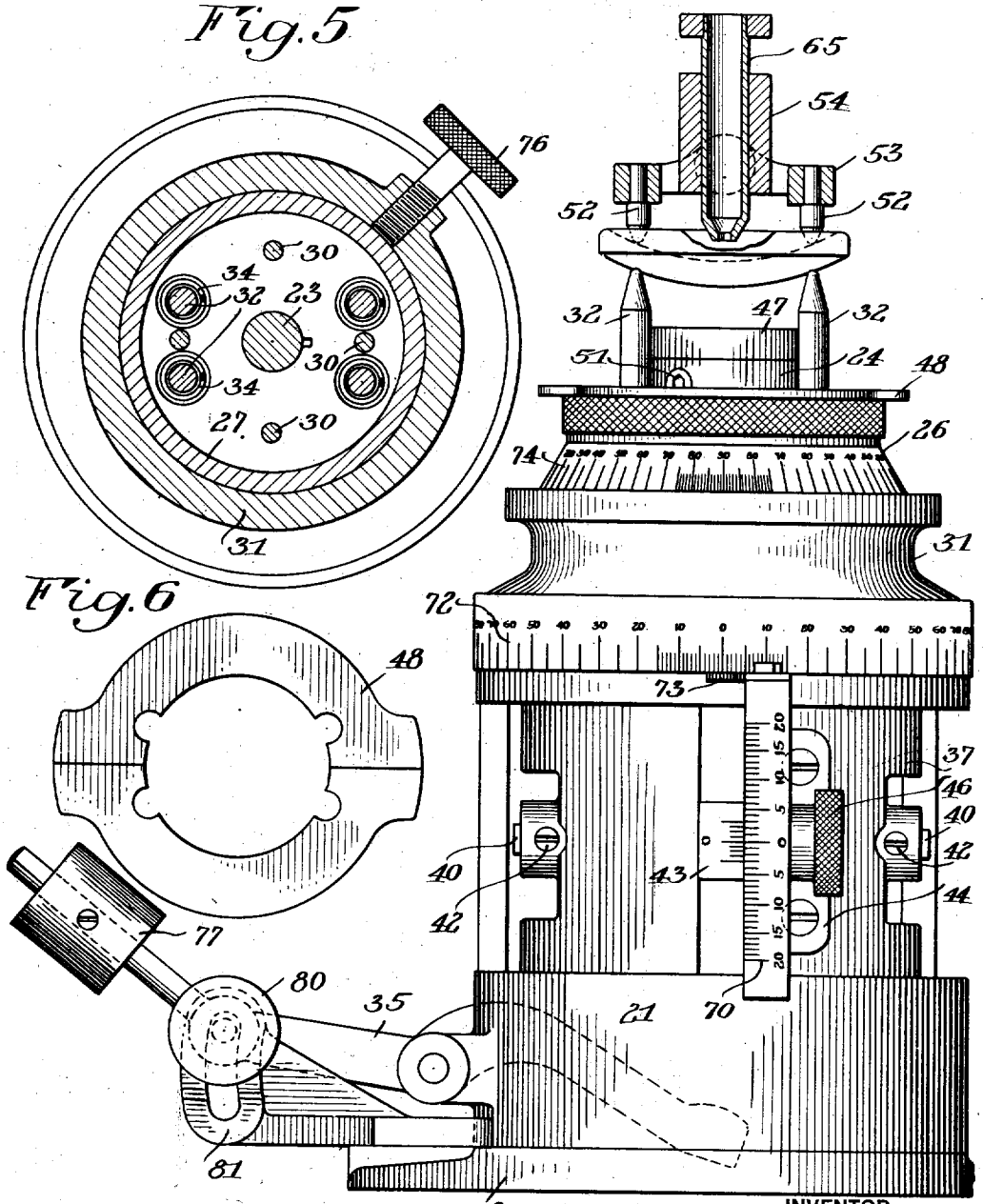
Figure 2 is a side elevation of the assembled device.
Figure 5 is a view taken substantially on line 5—5 of Figure 3.
Figure 6 is a plan view of the index plate.

After the lens block has been placed in position, the adapter, rod and lens block are placed in the device and the adapter and lens block will occupy the positions shown in Figure 2. A lens blank may then be mounted on the upper end portions of the lens supporting pins and clamped in position by means of the pressure pins 52.

The pressure pins 52 are mounted on a yoke 53 which is pivotally mounted on a boss 54 formed on an end of a supporting arm 55 which is mounted for sliding movement on the vertical post 56. The post 56 is carried by a lug 57 formed on the supporting member 21. A key 60 locks the arm 55 against rotational movement and a locking screw 61 is provided for locking the said arm against vertical movement. A helical spring 62 has its end anchored at 63 and 64 on the supporting arm 55 and lug 57 and tends to draw the supporting arm downwardly when the locking member 61 is released.

A sight tube 65 extends through an opening in the box 54 and it is so positioned that its vertical axis lies in the vertical axis of the lens block, adapter, and supporting rod 23. A set screw 66 is provided for locking the sight tube in position.

The lens blank should be provided with a center mark and an axis line relatively to which the cylinder axis is to be located before being placed in position on the lens supporting pins. If it is desired to produce a finished lens having an edge of uniform thickness the lens supporting pins should all be adjusted to the same height. This is done by adjusting the table member until its upper surface is level. If it is desired to make a lens with a prism, the table member is rocked until its upper surface forms the proper angle with the horizontal. In this manner the relative heights of the lens supporting pins are changed the proper amount, elevating one side portion of the lens blank and lowering the opposite side portion.

For aiding in determining the angular position of the top of the table member relatively to the horizontal and thus determining the relative positions of the lens supporting pin members, a scale 70 is inscribed upon the fixed bracket 44 and a cooperating vernier 71 is inscribed upon the outer end of the movable adjusting arm 43.

When the lens supporting pins, through the agency of the table member and adjusting arm, have moved to their proper positions, the table member is locked in position by means of the screw 46 and the supporting member 37 carrying the table member and the fixed bracket 44 may be rotated relatively to the adapter and the pin 50 sufficiently to place the base of the prism in the desired meridian. For aiding in determining the angular displacement of the prism base relatively to the pin 50, scale 72 and the cooperating index member 73 are provided.

In attaching the lens blank to the block by means of the device of this application the blank is positioned relatively to the longitudinal axis of the pin 50. In the machine of my copending application mentioned above the longitudinal axes of the pin which corresponds to the pin 50 lies in a horizontal plane containing one of the principal meridians of a lens immediately after the grinding operation and before the removal of the lens and lens block from the machine. Accordingly, in fixing or adjusting the positions of the axis line and the prism base relatively to the axis of the pin 50, their positions relatively to the cylinder axis of the finished lens are also fixed.

To place the axis line of the lens blank in the proper angular position relatively to the pin 50, the members 26 and 27 carrying the lens supporting pins and index plate 48 are rotated about the adapter through the desired angle as indicated by the graduated scale 74 on the member 26 and the index line 75. The screw 76 extending through the wall of the member 31 and into contact with the member 27 may be manipulated for locking the members 26 and 27, the index plate and lens supporting pins in their proper angular positions.

When the proper adjustments of the various parts of the device have been made the lens blank is shifted to such a position that the marked center comes directly under the aperture in the sight tube 65 and the axis line inscribed thereon coincides with the axis line on the index plate 48.

After the lens blank has been properly positioned the arm 55 carrying the pressure pins 52 is locked in position by means of the screw 61. The lens blocking body is then heated by gas flame or other means until the pitch is softened, after which the blocking body is moved into engagement with the lower surface of the lens blank by downward pressure on the lever arm 35. A weight 77 mounted on the lever 35 is sufficiently heavy to press the blocking body gently against the lens blank. A locking screw 80 extending through a slot in a bracket 81 carried by the base 20 and entering a threaded opening in the lever arm 35 may be manipulated to lock the lever 35 in position. The lever arm 35 is preferably not locked in position while the pitch is cooling, as in cooling the pitch contracts and if the lever arm were locked against movement, an objectionable strain between the lens and the blocking body would be created.

When the pitch has cooled and hardened the lens blank is firmly held on the blocking body and the blocking body may be transferred to the generating machine.

From the foregoing it will be seen that there is herein provided a device which embodies the features of this invention and achieves the objects thereof. A lens blocking device is provided which is of simple and durable construction and by means of which a lens blank may be quickly attached to a blocking body in such a manner that it may be readily transferred to a grinding or generating machine and ground to provide a lens having the prism base and cylinder axis accurately positioned in the desired meridians.

As many possible embodiments may be made of this invention, and as many changes might be made in the embodiment above set forth, it is to be understood that all matter hereinbefore set forth or shown in the accompanying drawings is to be interpreted as illustrative and not in a limiting sense.

I claim as my invention:

1. In a lens blocking device, a support, a pivotally mounted table member thereon, lens supporting means mounted on and movable relative to said table member, and a lens block adapter for supporting a lens block arranged to support a lens carried by said lens supporting means.

2. In a lens blocking device, a rotatable support, a table member pivotally mounted on said support separate relatively movable, lens supporting devices mounted on said table member, and a lens block adapter for supporting a lens block arranged to support a lens carried by said lens supporting devices.

3. In a lens blocking device, a frame, a pivotally mounted table member mounted on said frame, lens supporting means slidable on said frame and engaging said table member, means for holding a lens in position on said lens supporting means, and a lens block adapter for supporting a lens block arranged to support the lens carried by said lens supporting means.

4. In a lens blocking device, a rotatable support, a table member tiltably mounted on said support, means for securing the table member in different tilted positions upon the support, lens supporting devices mounted on said table member, resilient means for holding a lens in position on said lens supporting devices, and a lens block adapter for supporting a lens block arranged to support the lens carried by said lens supporting means.

5. In a lens blocking device, a lens block adapter vertically disposed, lens supporting members positioned on opposite sides of said adapter, guide means for said members, and means for simultaneously moving said lens supporting members vertically and in opposite directions to adjust the position of a lens thereon.

6. In a lens blocking device, a lens block adapter, a lens block carried thereby and arranged to support a lens blank, a rotatable support, a table member pivotally mounted on said support and arranged to be tilted thereon to different angular positions, and upstanding pin members positioned on opposite sides of said adapter and engaging said table member at different points of elevation, the upper ends of said pin members forming a support for the lens blank.

7. In a lens blocking device, an adjustably mounted lens block adapter, a rotatable support, a table member pivotally mounted on said support, lens supporting pin members positioned adjacent said adapter and engaging said table member, and resilient means for holding said pin members in engagement with said table member, the adapter being mounted in a position to be secured to a lens supported on said pins.

8. In a lens blocking device, an adjustably mounted lens block adapter, a support rotatable about the vertical axis of said adapter, a table member pivotally mounted on said support, vertically extending pin members engaging said table member and movable about the vertical axis of said adapter independently of said table member.

9. In a lens blocking device, an adjustably mounted lens block adapter, a support rotatable about the vertical axis of said adapter, a table member pivotally mounted on said support, a plurality of lens supporting pin members mounted for rotation about the vertical axis of said adapter arranged to engage the table, and means for holding a lens in position on said pin members.

10. In a lens blocking device, a base, a plurality of vertically disposed relatively movable lens supporting elements arranged to engage a lens at different points, means movable upon the base to effect vertical movement of said elements one relative to another whereby to shift the lens to a predetermined position, and means movable relative to said elements arranged to support or hold the lens in said position.

11. In a lens blocking device, a base, a plurality of vertically disposed relatively movable lens supporting elements arranged to engage a lens at different points, guide means for said elements, means movable upon the base to simultaneously effect vertical movement of said elements whereby to shift the lens to a predetermined angular position with respect to the horizontal and a lens block movable vertically to support the lens in the position to which it is moved by said elements.

12. In a lens blocking device, a base, a plurality of vertically disposed relatively movable lens supporting elements arranged to engage a lens at different points, guide means for said elements, means movable upon the base to simultaneously effect vertical movement of said elements whereby to shift the lens to a predetermined angular position with respect to the horizontal, and relatively movable devices for engaging opposite sides of the lens to hold it in said position.

13. In a lens blocking device, a base, a plurality of vertically disposed relatively movable lens supporting elements arranged to engage the lens at different points, means movable upon the base to effect vertical movement of said elements one relative to another whereby to shift the lens to a predetermined position, means for rotating said elements to effect rotation of the lens, means above the lens for holding it in engagement with said elements, and means beneath the lens for supporting it in said predetermined position.

14. In a lens blocking device, a base, a plurality of relatively movable devices forming means for supporting a lens in a substantially horizontal position, one or more of which is adjustable to move the lens relative to said position, rotary control means for said adjustable devices adapted during rotation to move the latter whereby to shift the lens to said position, and relatively movable holding parts adjustable to engage the opposite sides of said lens when moved to said position.

15. In a lens blocking device, a base, a plurality of relatively movable devices forming means for supporting a lens in substantially horizontal position, one or more of which is adjustable to move the lens relative to said position, rotary control means for said adjustable devices adapted during rotation to move the latter whereby to shift the lens to said position, relatively movable holding parts adjustable to engage the opposite sides of said lens when moved to said position, and a sight tube carried by one of said parts for viewing a mark on the lens whereby to determine when the lens is in a predetermined position of adjustment on said devices.

16. In a lens blocking device, a base, relatively movable devices on the base for supporting a lens in substantially horizontal position, operating means for moving one or more of said devices whereby to shift and incline the lens with respect to the horizontal, a support carried by the base, and a sight tube on the support for viewing a mark on the lens whereby to determine when the lens is in a predetermined position of adjustment on said relatively movable devices.

17. In a lens blocking device, a base, lens supporting means carried by the base for holding a lens in a predetermined position and including parts certain of which are movable to shift the lens relative to said position, means for effecting movement of said parts and a lens block movable between said parts into position to support said lens.

18. In a lens blocking device, a base, a lens supporting block adjustable thereon, relatively movable devices engaging the lens at different points and adjustable to shift it to a predetermined position for subsequent support by the lens block, means for effecting movement of said devices to shift said lens to said position, and means for moving the lens block to support the lens in said position.

19. In a lens blocking device, a base, a lens supporting block adjustable upon the base, relatively movable devices engaging the lens at different points on the side nearest the block, means for simultaneously rotating and moving said devices one relative to another to move the lens to a predetermined position, and means for moving the lens block to support the lens in said position.

20. In a lens blocking device, a base, a lens supporting block adjustable upon the base, relatively movable devices engaging the lens at different points on the side nearest the block, means for simultaneously rotating and moving said devices one relative to another to move the lens to a predetermined position, means for moving the lens block to support the lens in said position, a holding device supported by and mounted for movement relative to the base and including means arranged to engage and hold the lens upon said relatively movable devices, and a sight tube carried by said holding device for viewing a mark on the lens to determine when the lens is adjustable to a predetermined position.

21. In a lens blocking device, a base, a rotary support carried by the base, a device tiltable upon the support to different angular positions, means for holding said device in said different positions, a plurality of lens supporting elements having their lower ends resting on said device, the upper ends of said elements being adapted to receive a lens, guide means for said elements rotatably mounted to move the same whereby to shift the lens to a predetermined position, and means movable relative to said elements arranged to cooperate therewith in holding the lens in said position.

22. In a lens blocking device, a base, a member tiltably mounted within the base, means for holding said member in different adjusted positions, a plurality of lens supporting elements resting on and projecting upwardly from said tiltable member and arranged to receive a lens on their upper ends, guide means through which said elements are projected, said guide means being rotatable to effect rotation of said elements whereby they are moved vertically one relative to another to shift the lens to a predetermined position, said guide means and said base having cooperating scale and index markings for indicating the extent of rotation of the guide means and said base and tiltable member also having cooperating scale and index markings for indicating the angular relationship of the tiltable member relative to the horizontal, means for exerting pressure on the lens to hold it in adjusted position upon said supporting elements, and a lens block adjustable beneath the lens into supporting relationship with respect thereto.

23. A lens blocking device comprising a support, a lens block holder slidably mounted on said support, a member rotatably mounted to turn about the axis of said lens block holder, a table pivotally mounted on said member and lens supporting means carried by said table.

24. A lens blocking stand having in combination a base, means for supporting a lens, said means being movably mounted on said base to turn about different axes, a holder for a lens block and means for producing a relative movement between said holder and said first named means to bring the lens and block into contact with each other.

25. A lens blocking device comprising a support, lens holding means movably mounted on said support, means for angularly adjusting said lens holding means about axes which lie in perpendicular planes, a lens block holder and means for moving said holder toward a lens carried by said lens holding means.

26. A lens blocking device having in combination a base, a lens block holder slidably mounted on said base, lens supporting means movably mounted on said base, said means being mounted for angular adjustments about different axes, scale means for indicating said adjustments, one of said axes being coincident with the axis of said lens block holder.

27. A lens blocking device comprising a base, a lens holder movably mounted on said base, means for angularly adjusting said holder about vertical and horizontal axes, a vertically disposed lens block holder mounted on said base and means for moving one of said holders toward the other to bring a lens block and a lens on said support into contact with each other.

28. A lens blocking device comprising a support, a member movably mounted on said support to turn about a vertical axis, a table mounted on said member to move about a horizontal axis, lens supporting means carried by said table and means for moving a lens block into contact with a lens on said supporting means.

29. A lens blocking device comprising a support, a member movably mounted on said support to turn about an axis, a table pivotally mounted on said member to tilt about another axis which is substantially perpendicular to said first named axis, means carried by said table for supporting a lens, a lens block and means for moving said block into contact with the lens.

30. A lens blocking device having in combination a base, a lens support movably mounted on said base for angular adjustments about different axes, a lens block holder and means for producing between said lens support and block holder a relative angular adjustment about the axis of the block holder.

31. A lens blocking device having in combination a base, a lens support movably mounted on said base, vertically adjustable lens engaging means for clamping a lens against said support, a lens block holder movably mounted on said base, means for moving said holder to bring a lens block into contact with a lens on said support, and centering means mounted adjacent to said lens engaging means for centering a lens on said support.

32. A lens blocking device having in combination a base, a lens support movably mounted on said base for angular adjustment about different axes, a bracket carried by said base, lens engaging means adjustably mounted on said bracket for releasably clamping a lens on said support and means carried by said bracket for centering a lens on said support.

JOSEPH J. McCABE.